United States Patent Office
3,253,484
Patented May 31, 1966

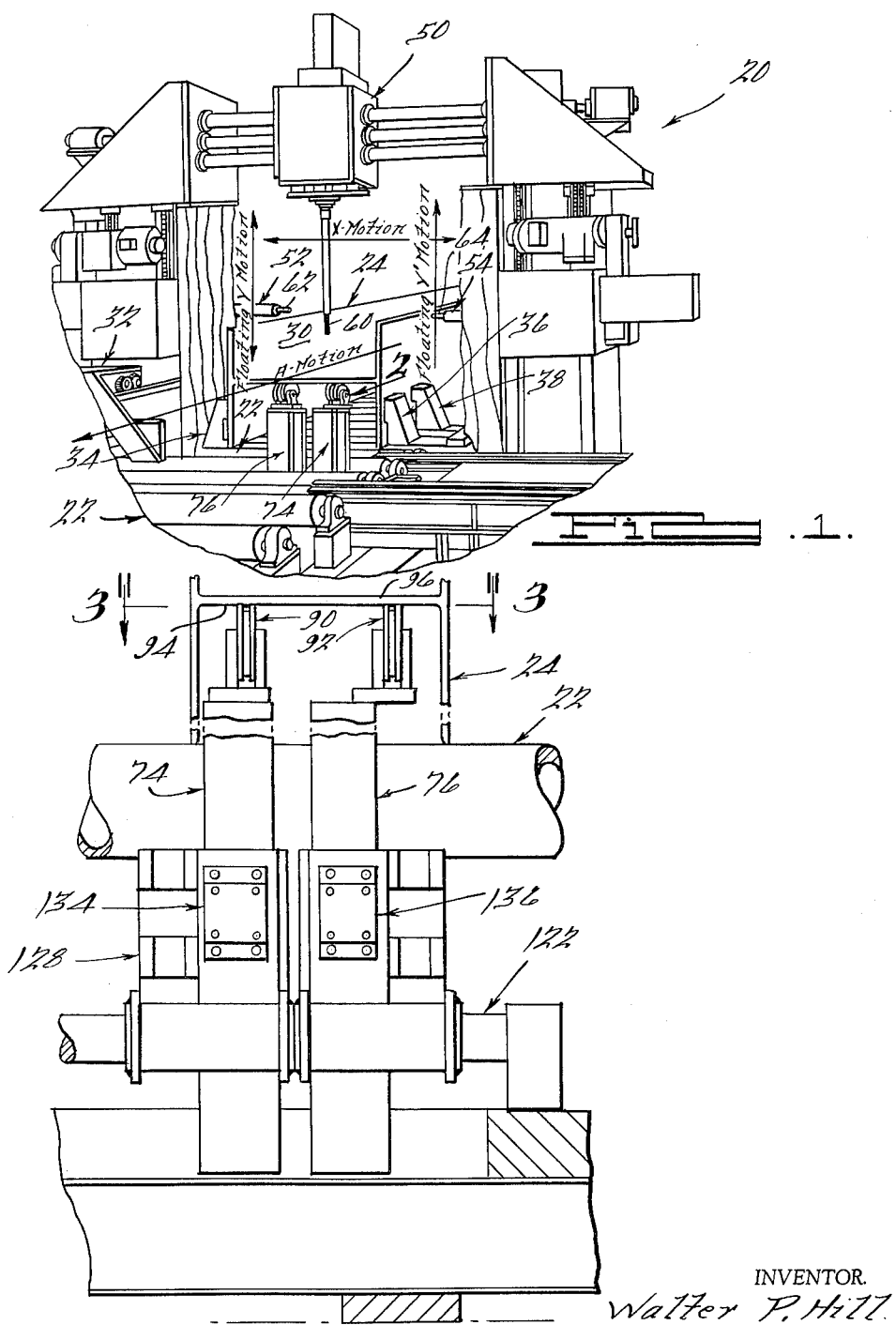

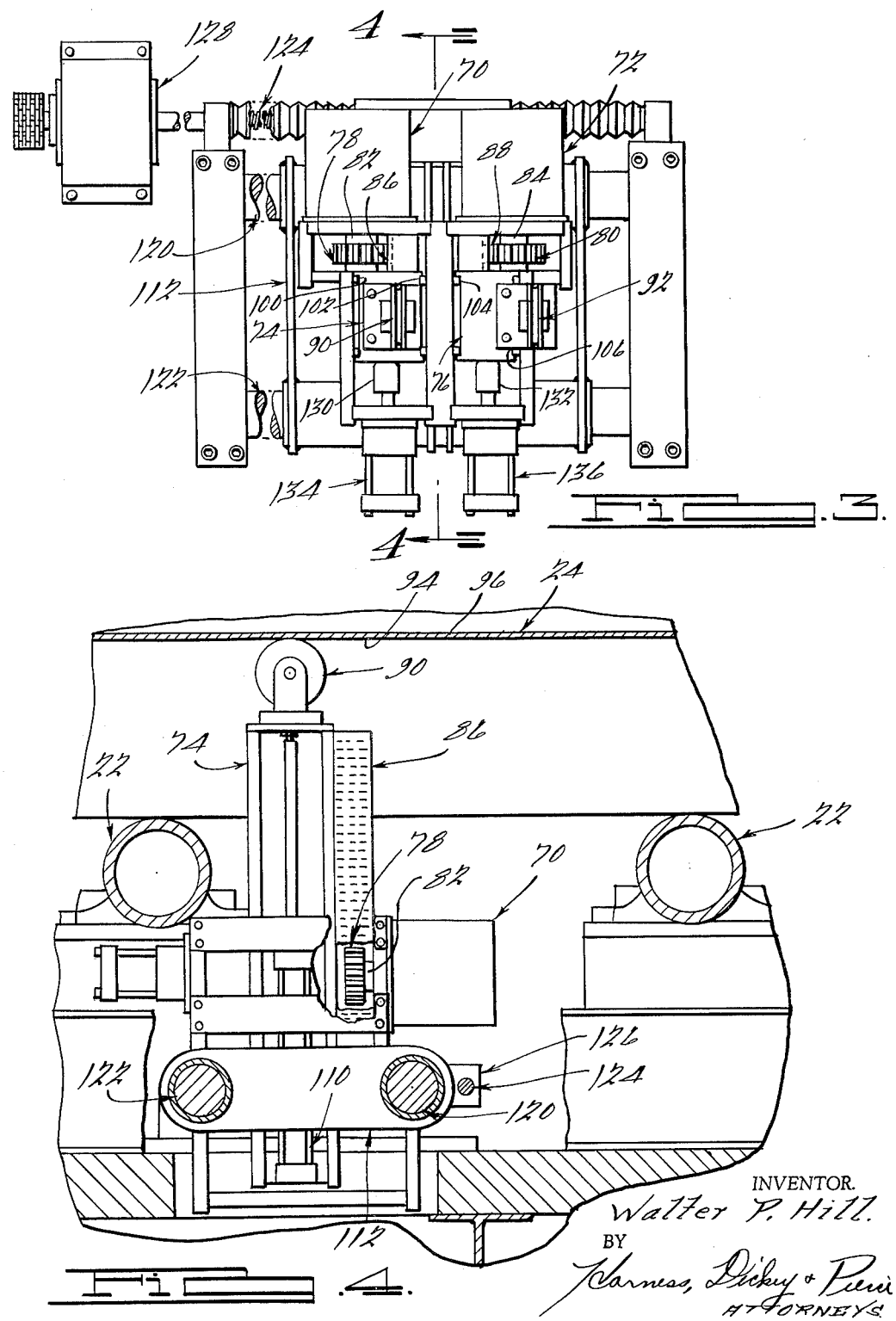

3,253,484
BEAM FABRICATING MACHINE WITH FLOATING REFERENCE PLANE
Walter P. Hill, Troy, Mich., assignor to Walter P. Hill, Inc., Troy, Mich., a corporation of Michigan
Filed Nov. 9, 1962, Ser. No. 236,530
2 Claims. (Cl. 77—32.2)

This invention relates generally to beam fabricating machines and more particularly to a numerically controlled beam fabricating machine with a floating reference plane.

Numerical positioning control systems are generally applicable to any machine having a movable component that is positionable at a numerically definable point with respect to a fixed component. Such control systems comprise an intelligence input device, a position sensing system, means for correlating the input and position intelligence, and a prime mover for the movable component of the machine that is responsive to the correlating means. Whenever the movable component of the machine tool is in a position other than the position defined by the input intelligence, an error signal is transmitted from the position sensing system to the correlating means of the control system, which analyzes the error signal and energizes the prime mover in accordance therewith.

In some applications where a workpiece is of relatively large dimension, for example, a structural beam having a longitudinal dimension of fifty feet, a table for the support of such a workpiece would be prohibitively large and inherently difficult to accurately position. This problem was solved by the beam fabricating machine disclosed in applicant's application Serial No. 114,926, filed June 5, 1961, now Patent No. 3,090,261 for: Numerically Controlled Beam Fabricating Machine which eliminates the conventional movable component of the machine. The beam fabricating machine disclosed in the aforesaid application supports the workpiece on a plurality of numerically controlled drive rolls which move the workpiece to a predetermined longitudinal position with respect to a work station as sensed by a novel longitudinal position sensing system. The workpiece is maintained at a predetermined vertical index position or horizontal reference plane by its own weight and is biased to a horizontal index position or vertical reference plane by suitable clamping apparatus. A longitudinal position sensing system reflects the longitudinal position of the beam with respect to a work station.

Experience in the field in the use of the aforementioned beam fabricating machine indicates that a problem arises when structural beams having dimensional deviations are encountered. Since the aforementioned beam fabricating machine utilizes the weight of the workpiece to maintain the workpiece on the surface of the rolls thereby defining the vertical index position or horizontal reference plane for the workpiece, any tolerance deviation or warpage between the lowermost portion of the beam which rests on the drive rolls and the portion of the beam being drilled results in an inaccurate hole pattern. In other words, when a beam is warped or the web of the beam is inaccurately positioned vertically of the flanges thereof, the hole pattern drilled in the flanges relative to the lowermost point on the flanges of the beam may be inaccurately positioned relative to the web of the beam. However, engineering practice makes it desirable to have the hole pattern in the flanges of the beam orientated and positioned relative to the web section thereof. Accordingly, it is necessary that the position of the web relative to the surface of the rolls be accurately known so that the web can be used as a vertical index or horizontal reference plane to orientate the hole pattern in the flange of the beam.

In accordance with the instant invention, a zeroing unit is provided that maintains contact with spaced portions of the web of the beam at the drill station. The zeroing unit independently floats the vertical index position or horizontal reference plane for the Y and Y' drill units up and down as the web section of the beam varies up or down because of warpage and tolerance deviations. This means that the Y and Y' zero index position is no longer the surface of the rolls but at some vertically floatable point.

Accordingly, one object of the present invention is an improved beam fabricating machine.

Another object is an improved positioning system for a beam fabricating machine capable of positioning a warped beam with respect to a tool.

Another object is a beam fabricating machine having a floating reference plane that properly positions a drill unit with respect to a portion of the workpiece.

Other objects and advantages of the present invention will be apparent in the following specification, claims and drawings, wherein:

FIGURE 1 is a perspective view of the work station of a beam fabricating machine in accordance with an exemplary constructed embodiment of the present invention;

FIG. 2 is a view of the sensing mechanism for the floating reference plane taken in the direction of the arrow 2 of FIGURE 1;

FIG. 3 is a view taken along the line 3—3 of FIG. 2; and

FIG. 4 is a view taken substantially along the line 4—4 of FIG. 3.

Referring to FIGURE 1 of the drawings, a beam fabricating machine 20, in accordance with an exemplary constructed embodiment of the present invention, comprises a plurality of rolls 22 for the support of, for example, an I beam 24.

The beam 24 is advanced longitudinally through a work station, generally designated by the numeral 30 in the rolls 22. Movement of the beam 24 along the rolls 22 or, in other words, along what is designated as an A axis of movement, is effected by driving the rolls 22 by a prime mover, for example, a servo motor (not shown). The position of the beam 24 along the A axis is sensed by a sensing system mounted on a carriage 32 that, like the rolls 22, is driven by a servo motor (not shown).

A horizontal index position or vertical reference plane for the beam 24 is defined by a stop 34, the beam 24 being biased thereagainst as by a pair of movable jaws 36 and 38. Thus, the beam 24 is movable through the work station 30 to a desired longitudinal position and thereafter positively positioned at a predetermined horizontal index position against the stop 34.

The work station 30 is provided with a plurality of numerically controlled drill units 50, 52 and 54 which are movable along axes designated as X, Y and Y', respectively. The drill units 50, 52 and 54 are preferably positionable along the X, Y and Y' axes under the control of a numerically controlled positioning system described in Patent No. 3,020,705 for: Positioning System. The drill units 50, 52 and 54 are provided with drills 60, 62 and 64, respectively, which are advanceable toward the beam 24 to drill holes therein at predetermined positions.

As best seen in FIG. 3, the vertical index positions or horizontal reference planes for the Y and Y' motions are individually sensed and controlled by a pair of selsyns 70 and 72. The selsyns 70 and 72 are coupled to a pair of vertically movable slides 74 and 76 by gears 78 and 80 on output shafts 82 and 84 of the selsyns 70 and 72 which are engageable with complementary racks 86 and 88 on the slides 74 and 76, respectively. The slides 74 and 76 are provided with rolls 90 and 92 at the upper ends thereof for engagement with a bottom surface 94 of a web portion 96 of the I-beam 24.

Output signals from the selsyns 70 and 72 are fed to the positioning control system (not shown) which energizes prime movers for the drill units 54 and 52 in accordance therewith, respectively, to move the drill units 54 and 52 of the drill station 30.

The slides 74 and 76 are movable independently in complementary ways 100–102 and 104–106, respectively, by a pair of hydraulic actuators, one of which is shown, and designated by the numeral 110 (FIG. 4). Thus, it will be seen that warpage of the beam 24 which tends to orientate the web portion 96 thereof at an angle relative to the axis of the rolls 22 is accommodated by the slides 74 and 76 which are movable independently into engagement with opposite edge portions of the bottom surface 94 of the web portion 96.

As best seen in FIG. 3 of the drawings, the selsyn unit 70 and its associated vertically movable slide 74 is mounted on a carriage 112 that is movable laterally of the drill station 30 on a pair of tubular ways 120 and 122. The carriage 112 and therefore the selsyn 70 and slide 74 are movable on the ways 120 and 122 under the control of a lead screw 124 that is engaged in a suitable nut 126 (FIG. 4) attached to the carriage 112. The lead screw 124 is driven through a speed reducer 128 by a conventional electric motor (not shown) to position the selsyn 70 in accordance with the width of the web portion 96 of the beam 24.

In certain instances, it is desirable to lock the slides 74 and 76 at a desired vertical position due to a particular workpiece configuration or upon advancement of the web portion past the work station 30. Accordingly, the slides 74 and 76 are lockable at a desired position by a pair of rams 130 and 132 on a pair of hydraulic actuators 134 and 136, respectively. The rams 130 and 132 are engageable with the sides of the slides 74 and 76, respectively.

From the foregoing description, it should be apparent that variations in the hole pattern in the flanges of the beam 24 due to dimensional variations or warpage of the web portion 96 thereof is eliminated by floating the Y and Y' reference planes vertically in accordance with the actual sensed position of the web 96. Thus, despite the fact that the beam 24 is vertically positioned relative to the drill station 30 due to engagement with the rolls 22, the horizontal reference planes for the Y and Y' motions float vertically along the Y and Y' axes, as sensed by the selsyns 72 and 70, respectively.

It is to be understood that the specific construction of the improved beam fabricating machine with floating reference plane herein disclosed and described is presented for the purpose of explanation and illustration and is not intended to indicate the limits of the invention, the scope of which is defined by the following claims.

What is claimed is:

1. In a numerically controlled beam fabricating machine comprising
   a numerical control system having input means for the acceptance of dimensional intelligence and a plurality of output characteristics,
   a plurality of rolls for the support of the beam,
   a work station,
   means for driving said rolls to position the beam longitudinally of said work station in accordance with an output characteristic from said control system,
   means for positioning said beam laterally of said work station relative to a vertical reference plane, and
   a drill unit movable laterally of said work station to a position relative to said vertical reference plane dictated by a second output characteristic from said control system, the improvement comprising
   sensing means connected to said numerical positioning control system movable vertically of said work station and engageable with a preselected portion of said beam for establishing a horizontal reference plane, and
   a drill unit movable vertically of said work station to a position relative to the horizontal reference plane in response to an output characteristic from said control system.

2. In a numerically controlled beam fabricating machine comprising
   a numerical control system having input means for the acceptance of dimensional intelligence and a plurality of output characteristics,
   a plurality of rolls for the support of the beam,
   a work station,
   means for driving said rolls to position the beam longitudinally of said work station in accordance with an output characteristic from said control system,
   means for positioning said beam laterally of said work station relative to a vertical reference plane, and
   a drill unit movable laterally of said work station to a position relative to said vertical reference plane dictated by an output characteristic from said control system, the improvement comprising
   first sensing means connected to said numerical positioning control system movable vertically of said work station and engageable with one side of said beam for establishing a first horizontal reference plane,
   a drill unit movable vertically of said work station to a position relative to the first horizontal reference plane in response to an output characteristic from said control system,
   second sensing means connected to said numerical positioning control system movable vertically of said work station and engageable with the other side of said beam for establishing a second horizontal reference plane, and
   a drill unit movable vertically of said work station to a position relative to the second horizontal reference plane in response to an output characteristic from said control system.

References Cited by the Examiner

UNITED STATES PATENTS 3,094,015  6/1963  Mead _____ 77—32.2 XR

FOREIGN PATENTS 410,085  2/1925  Germany.

WILLIAM W. DYER, JR., *Primary Examiner.*

J. S. OVERHOLSER, *Examiner.*

F. S. HUSAR, *Assistant Examiner.*